May 27, 1952  R. COLOMBO  2,597,975
METHOD OF MANUFACTURING HOSE OF SYNTHETIC
THERMOPLASTIC MATERIALS
Filed Feb. 19, 1948

INVENTOR.
Roberto Colombo
BY
Haseltine, Lake & Co.
AGENTS.

Patented May 27, 1952

2,597,975

UNITED STATES PATENT OFFICE 2,597,975

METHOD OF MANUFACTURING HOSE OF SYNTHETIC THERMOPLASTIC MATERIALS

Roberto Colombo, Turin, Italy

Application February 19, 1948, Serial No. 9,582
In Italy April 28, 1944

Section 1, Public Law 690, August 8, 1946
Patent expires April 28, 1964

4 Claims. (Cl. 18—59)

It is known that hoses of plastic material, when curved through narrow radii, are strangled and obstruct normal flow of gas or liquid conveyed therethrough. In order to avoid this, these hose are usually ribbed with wire or bands or provided with plaitings which are adapted to increase internal pressures. Use is frequently made also for this purpose of hoses with intermediate fabric layers or metal hoses with sheaths for supporting moderate internal pressures.

The object of this invention is a method of manufacturing reinforced hoses wholly of thermoplastic material. The hoses made according to my improved method consist of two distinct parts, including an inner portion constituting the hose proper, made of thermoplastic materials, for instance vinyl chloride of the synthetic material known under the name of Panol; and an outer portion constituted of a relatively rigid synthetic material, helical-shaped and serving as sheathing for the inner hose. By the process according to this invention, the tube proper and the outer sheath may be obtained in endless form in one operation by extrusion.

In the accompanying drawing.

Figure 1:
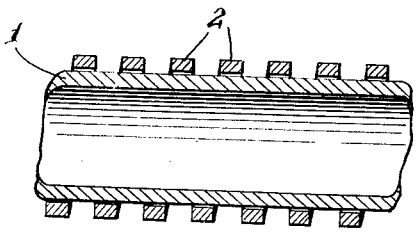
Fig. 1 shows an axial section of a hose with a helical sheath wholly of synthetic thermoplastic material.

Referring to Figure 1, 1 denotes the inner hose and 2 the helix of sufficiently rigid material forming the sheath which fulfills the double purpose of preventing deformations when the tube is bent along curves and to withstand high pressures, since the sheath forms a continuous rib which is capable of resisting said pressures. A hose like the one shown, as mentioned above, is free of metallic parts, textile materials and the like and consists merely of thermoplastic materials, of which the inner one forming the hose 1 is particularly flexible and the other constituting the helix 2 is particularly stiff. This hose is particularly suitable for use in chemical manufactures, as the materials of which it is constituted are unattacked by chemical reagent.

Figure 2:
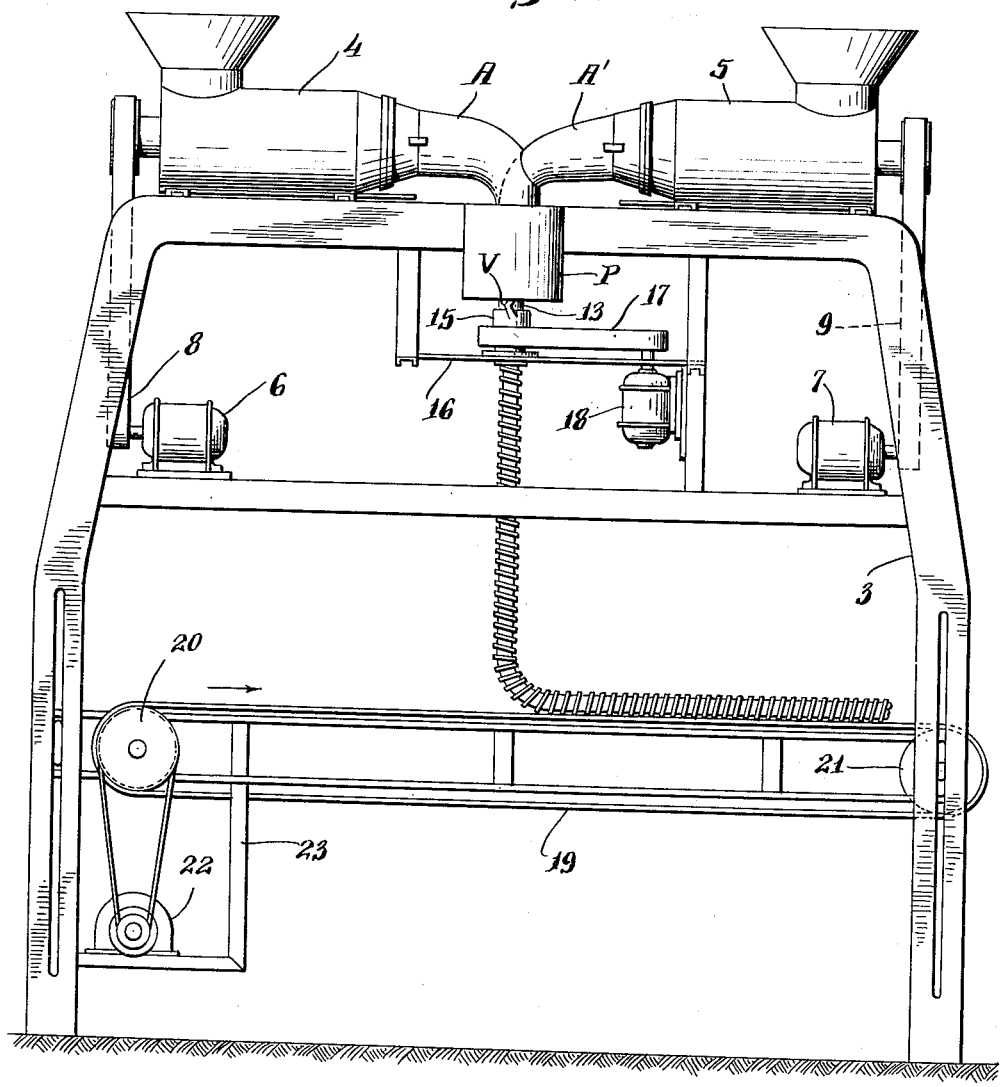
Fig. 2 shows a device for obtaining in a continuous maner a reinforced hose according to Fig. 1.

In the apparatus shown in Fig. 2, 3 denotes a frame, having mounted thereon two extrusion presses 4 and 5, which are actuated by electrical motors 6 and 7 through transmission means 8 and 9.

The two presses 4 and 5 lead by their outlet pipes A and A' to an extrusion head P according to applicant's copending patent application No. 10,155, dated February 21, 1948, now Patent No. 2,592,658 by which a hose made of two layers; namely, an inner layer 1 of flexible material and an outer layer of stiff material, may be obtained. At the outlet 13 of the extrusion head, a cutter V rotating about the axis of the pressure die cuts a helical slit in the outer layer of the composite tube, as the latter is still in a semi-plastic condition, without substantially removing any material. The cutter 14 is mounted on a tubular member 15 rotatably supported by a frame 16 and rotated through a belt drive 17 by an electrical motor 18 fixed to the frame 3. The cutter V does not remove any material from the outer layer of the hose and the elongation of the hose and resulting widening of the helical slit forming the helix 2 take place simply by gravity. As the hose issues from the die in a semi-plastic condition, the weight of the soft hose causes the inner layer to stretch and the walls of the helical slit to be drawn apart. The hose is supported at a distance from the outlet of the extrusion die by an endless belt conveyor 19 rotatably supported on cylinders 20 and 21 and driven by the electrical motor 22. The cylinders 20 and 21 and the electrical motor 22 are mounted on a frame 23' vertically displaceable with respect to the frame 3. The traction on the extruded pipe, hence the degree of elongation desired are proportional to the distance between the outlet 13 of the extrusion die and support 19. Said distance may be varied by vertically displacing the frame 23 on the frame 3.

What I claim is:

1. The method of manufacturing thermoplastic hose having a helical reinforcement rib made of a thermophastic material having properties different than those of the material of the hose, which comprises producing by extrusion a two layer thermoplastic hose, cutting a helical slit in the outer layer as the composite hose issues from the extrusion die in semi-plastic condition and elongating the composite hose to stretch the inner layer and to space apart the walls of the helical slit.

2. The method of manufacturing thermoplastic hose having a helical reinforcement rib made of a thermoplastic material having properties different than those of the material of the hose, which comprises producing by extrusion a two layer thermoplastic hose, cutting a helical slit in the outer layer without substantially removing any material as the composite hose issues from the extrusion die in semi-plastic condition and elongating the composite hose to stretch the inner layer and to space apart the walls of the helical slit the elongation being effected by gravity as the hose issues from the die.

3. The method of manufacturing thermoplastic hose having a helical reinforcement rib made of a thermoplastic material having properties different than those of the material of the hose which comprises producing a two layer hose by extruding the basic thermoplastic material through a conduit of which the cross section equals in area the cross section of the final product and injecting the complementary thermoplastic material into the flow of the basic material ahead of the conduit opening in a direction slightly inclined to the line of normal to said flow, cutting a helical slit in the outer layer while still in semi-plastic condition without substantially removing any material by means of a cutter rotating in front of the extrusion die about the axis of said die and elongating the composite hose to stretch the inner layer and to space apart the walls of the helical slit.

4. The method of manufacturing thermoplastic hose, having a helical reinforcement rib made of a thermoplastic material having properties different than those of the material of the hose which comprises producing a two layer hose by extruding the basic thermoplastic material through a conduit of which the cross section equals in area the cross section of the final product and injecting the complementary thermoplastic material into the flow of the basic material ahead of the conduit opening in a direction slightly inclined to the line of normal to said flow, cutting a helical slit in the outer layer while still in semi-plastic condition without substantially removing any material by means of a cutter rotating in front of the extrusion die about the axis of said die and elongating the composite hose to stretch the inner layer and to space apart the walls of the helical slit, the elongation being effected by gravity as the hose issues from the die.

ROBERTO COLOMBO.

REFERENCES CITED

The following references are of record in the file of this patent:

UNITED STATES PATENTS

| Number | Name | Date |
|---|---|---|
| 2,126,733 | Catt | Aug. 16, 1938 |
| 2,232,514 | Pape | Nov. 11, 1941 |
| 2,301,207 | Garretson | Nov. 10, 1942 |
| 2,340,956 | Gillette | Feb. 8, 1944 |
| 2,367,643 | Hendrie | Jan. 16, 1945 |
| 2,371,991 | Harding | Mar. 20, 1945 |
| 2,383,733 | Parker | Aug. 28, 1945 |